(12) United States Patent
Busuioc

(10) Patent No.: US 7,231,416 B1
(45) Date of Patent: Jun. 12, 2007

(54) SYSTEM AND METHOD FOR THE CO-ORDINATION AND CONTROL OF INFORMATION SUPPLY USING A DISTRIBUTED MULTI-AGENT PLATFORM

(75) Inventor: Nicolae Marius Busuioc, Suffolk (GB)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/701,194

(22) PCT Filed: Jun. 11, 1999

(86) PCT No.: PCT/GB99/01866

§ 371 (c)(1),
(2), (4) Date: Nov. 27, 2000

(87) PCT Pub. No.: WO99/67708

PCT Pub. Date: Dec. 29, 1999

(30) Foreign Application Priority Data

Jun. 23, 1998 (EP) .................. 98304920

(51) Int. Cl.
*G06F 15/16* (2006.01)
*G06F 15/167* (2006.01)

(52) U.S. Cl. .............. 709/202; 709/201; 709/217; 709/218

(58) Field of Classification Search .......... 709/218, 709/203, 200, 201, 202, 217, 238; 707/5, 707/3, 10, 11
See application file for complete search history.

(56) References Cited

U.S. PATENT DOCUMENTS

| | | | |
|---|---|---|---|
| 5,682,482 A * | 10/1997 | Burt et al. ............... | 705/42 |
| 5,748,954 A * | 5/1998 | Mauldin .................. | 707/10 |
| 5,778,367 A * | 7/1998 | Wesinger et al. ........ | 707/10 |
| 5,826,261 A * | 10/1998 | Spencer .................. | 707/5 |
| 5,931,907 A * | 8/1999 | Davies et al. ........... | 709/218 |

(Continued)

FOREIGN PATENT DOCUMENTS

| | | |
|---|---|---|
| EP | 0529787 A2 | 3/1993 |
| WO | WO 96/23265 | 8/1996 |
| WO | WO 98/08164 | 2/1998 |

OTHER PUBLICATIONS

"Evolving agents for personalized information filtering". Sheth, B.; Maes, P. □□Artificial Intelligence for Applications, 1993. Proceedings., Ninth Conference on vol., Iss., Mar. 1-5, 1993 pp. 345-352□□.*
Patent Abstracts of Japan, vol. 097, No. 010, Oct. 31, 1997 & JP 09 160849 A (Nippon Telegr & AMP; Teleph Corp & LT; NTT & GT;N T T SOFTWARE KK), Jun. 20, 1997.

(Continued)

*Primary Examiner*—Saleh Najjar
*Assistant Examiner*—Ben Bruckart
(74) *Attorney, Agent, or Firm*—Nixon & Vanderhye P.C.

(57) ABSTRACT

A system and method for co-ordinating the supply of information from content service providers to a user, the system and method employing agents to search advertising boards for requested information or services. More specifically, a distributed platform is used for co-ordinating user access to information or services provided by content service providers. The platform comprises a user interface, a first advertising board for advertising services of information brokers and a first searching agent for searching the first advertising board for services that could be used by the user. The platform further comprises a second advertising board for advertising the services of information content suppliers, a second searching agent for searching the second advertising board for available services based on results of the search of the first advertising board and the request from the user.

19 Claims, 9 Drawing Sheets

U.S. PATENT DOCUMENTS

| | | | |
|---|---|---|---|
| 6,085,186 A * | 7/2000 | Christianson et al. | 707/3 |
| 6,108,686 A * | 8/2000 | Williams, Jr. | 709/202 |
| 6,286,002 B1 * | 9/2001 | Axaopoulos et al. | 707/10 |
| 6,289,325 B1 * | 9/2001 | Nakamura et al. | 709/202 |
| 6,480,881 B1 * | 11/2002 | Kubota et al. | 709/202 |
| 6,493,703 B1 * | 12/2002 | Knight et al. | 707/3 |

OTHER PUBLICATIONS

Packard, "An Extensible Agent Task Language", Hewlett-Packard Journal, vol. 40, No. 5, Aug. 1, 1989, pp. 38-42, XP00094709.

Terveen et al, "Helping Users Program Their Personal Agents", Common Ground, Chi '96 Conference Proceedings, Conference on Humna Factors in Computing Systems Vacouver, Apr. 13-18, 1996, pp. 355-361, XP000657833.

* cited by examiner

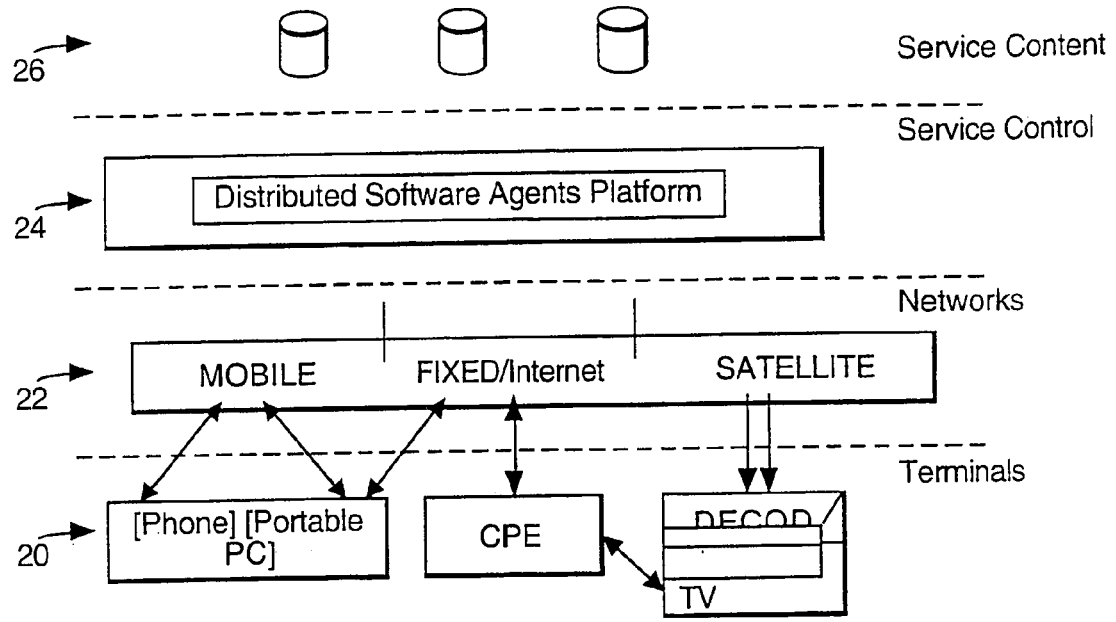
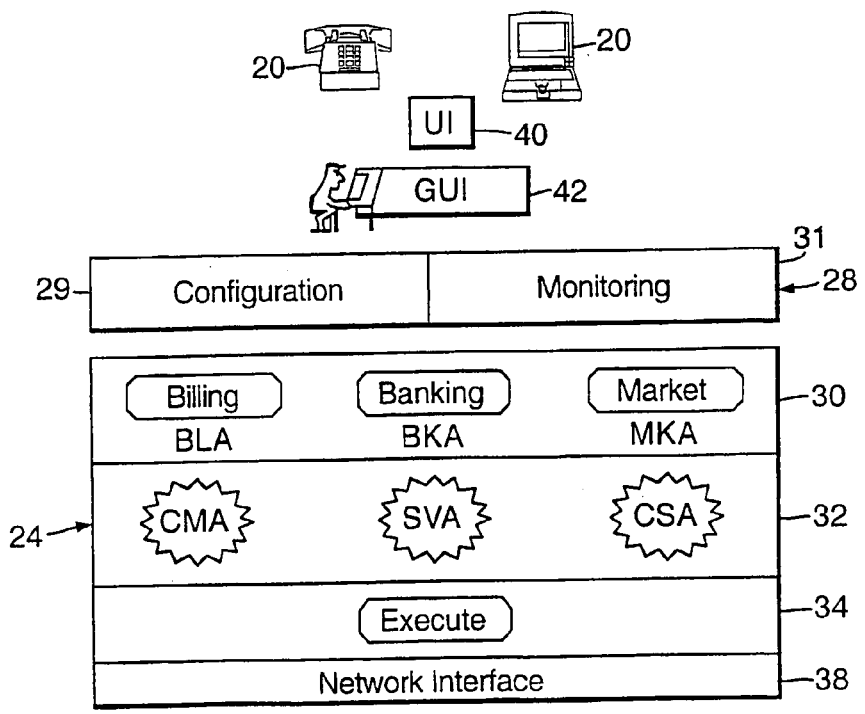

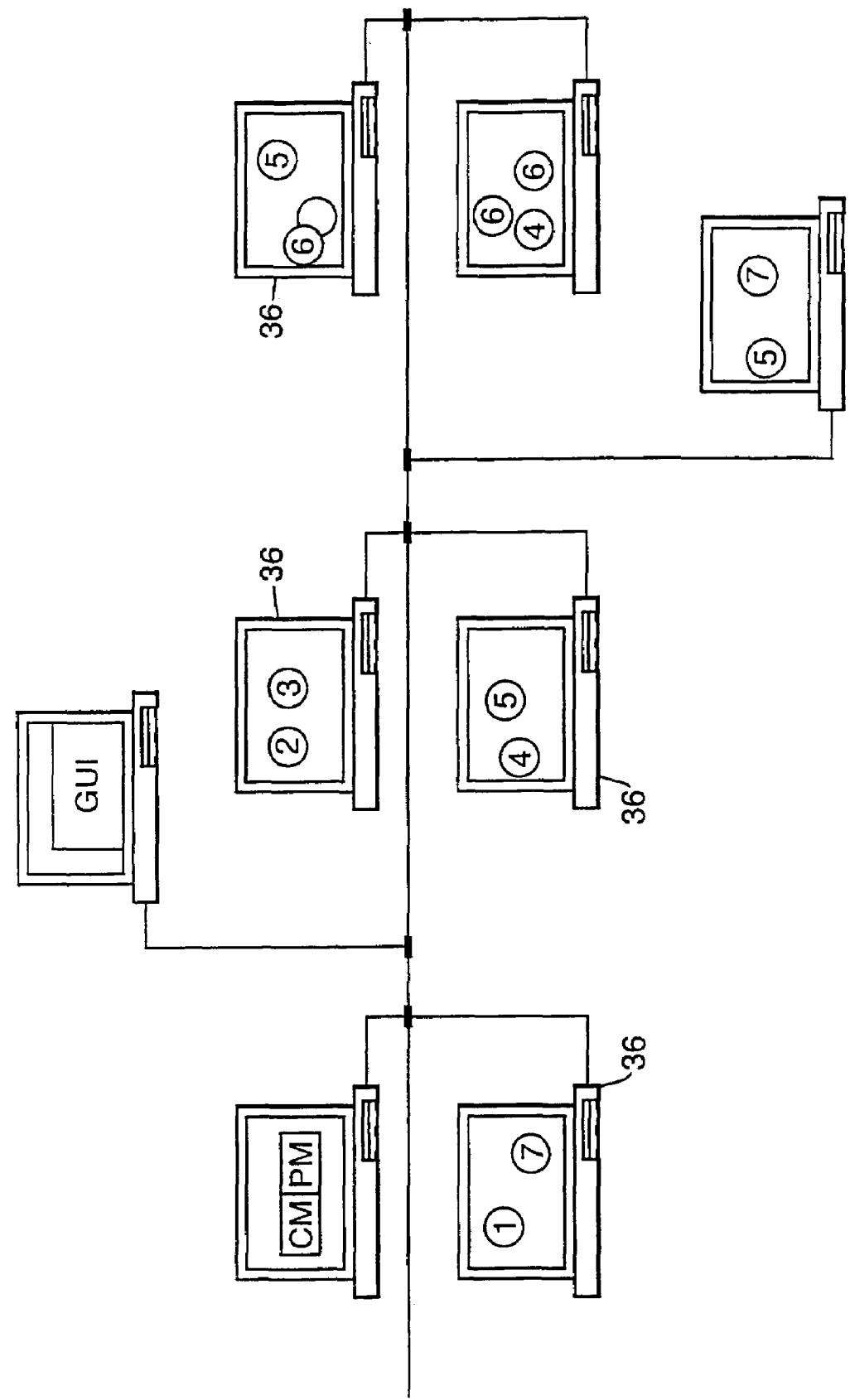

SYSTEM AND METHOD FOR THE CO-ORDINATION AND CONTROL OF INFORMATION SUPPLY USING A DISTRIBUTED MULTI-AGENT PLATFORM

BACKGROUND

1. Technical Field of the Invention

The present invention relates to a system and method for co-ordinating provision and management of information supply to customers.

2. Description of Related Art

Information content services are presently available, for example via the Internet. Such services typically enable a user to manually access digital libraries, for example using Internet management tools such as spiders, wanderers or search engines. However, the interaction between the user and the content provider is limited. Additionally, the user typically has to spend a significant amount of time connected to the Internet, searching various sites for items of interest. Furthermore, although there is an abundance of data available, it can be difficult for the user to navigate through it efficiently, locate items of interest and keep track of new data/information becoming available. Additionally, if information on the network is updated overnight, the user will not know about new information becoming available for access.

A further disadvantage of current information content services is that the tools available provide no flexibility regarding the time and location of delivery or viewing of the information found. This is because the searching has to be done "on-line" while the user waits in front of his computer screen. The user cannot determine the time and place of the delivery of information.

Other known information content services include video on demand systems that allow a user to choose videos manually from a list of movies supplied to the service provider by a handful of content providers. However, the lists available to users are generally not extensive and such systems provide limited interaction between the customer and the content provider. In addition, in these known systems, the user is only offered the services of predefined channels.

A yet further disadvantage of known systems is that the user generally has to pay for access to the Internet and then pay separately, typically using a credit card, for the services provided by the content service suppliers.

There is a need for a system that would provide users with greater freedom to obtain the multimedia content, for example text and/or video, from a larger variety of distributed sources, and furthermore to have that content delivered at a time and to a location of the user's choice.

BRIEF SUMMARY OF EXEMPLARY NON-LIMITING EMBODIMENTS OF THE INVENTION

According to one aspect of the present invention, there is provided a distributed platform for co-ordinating user access to information made available by content service providers, the platform comprising: a user interface; a first advertising board for advertising services of information content providers; a first searching agent for searching the first advertising board for services based on the request from the user, and means for providing the results of the search of the first advertising means to the user.

According to another aspect of the invention, there is provided a distributed platform for co-ordinating user access to information provided by content service providers, the platform comprising: a user interface; a first advertising board for advertising services of information brokers; a first searching agent for searching the first advertising board for services based on the request from the user; a second advertising board for advertising the services of information content suppliers; a second searching agent for searching the second advertising board for available services based on results of the search of the first advertising means and the request from the user, and means for providing the results of the search of the second advertising means to the user.

Preferably, the first and second advertising boards are distributed. Preferably, the first and second advertising boards each advertise services available in particular fields or market sectors, for example the boards may advertise the services of video content providers in a movie sector, or the services of providers of information relating to, for example, science and technology.

Preferably, means are provided, via the user interface, for interrogating the user to determine specific preferences, for example, where and/or how and/or when the information found by the second searching means is to be communicated.

Typically, a billing agent is provided for monitoring and billing customers for the services used. Each customer has a billing account that is continuously updated and reflects the current bill value for that customer. This account could also be monitored in connection with the customer's real bank account to prevent the use of services that the customer has no means to pay for.

Preferably, a banking agent is provided for monitoring all financial transactions that take place between the information brokers and the information content suppliers as a result of the request from the user. Each information content supplier and each information broker has an account that is monitored by the banking means and is up-dated as soon as a user accepted service is delivered.

According to another aspect of the present invention, there is provided a distributed platform for co-ordinating user access to information provided by content service providers, the platform comprising: a user interface; a content service provider advertising board for advertising services of content service providers; a first searching agent for searching the content service provider advertising board for services, based on a request from the user, and means for providing the results of the search of the content service provider advertising board to the user.

Preferably the distributed platform further includes: a broker advertising board for advertising the services of brokers that act as intermediaries between the content service provider and the user, and a second searching agent for searching the broker advertising board for available services based on the request from the user, wherein the second searching agent identifies a suitable broker and the first searching agent is associated with that broker.

According to another aspect of the present invention, there is provided a method for co-ordinating user access to information provided by content service providers, the method comprising receiving user requests for services; advertising services of information brokers in a first advertising board; searching the first advertising board for available services using a first searching agent, the search being based on the request from the user; advertising the services of information content suppliers in a second advertising board; searching the second advertising board for available services based on results of the search of the first advertising board and the request from the user, using a second searching agent, and providing the results of the search of said second advertising agent to the user.

Preferably, the method involves requesting more detailed information on services from the content suppliers.

Preferably, the method further includes the step of interrogating the user to determine specific preferences. Typically, this will include determining where and/or how and/or when the information found by the second searching means is to be communicated.

Preferably, the user can request that information be provided over a range of dates, so for example the user could be provided with an information update every day at, say, 2 pm. In this way the user is able to keep track of information becoming available.

Preferably, the user can specify the means via which the service is provided, for example by facsimile, or post or e-mail.

Preferably, each agent comprises a plurality of components each of which has a particular function to perform and each of which contains a process for implementing that function. Preferably, each component has a group message board on which messages are placed for communicating to processes within the component. Typically, one of the components has an internal message board on which inter-component messages are placed by processes for passing to group message boards within other components in the agent. One component may have an external message board on which messages are placed by processes in one agent for communicating to other agents in the distributed network. The internal and external message boards may be in the same component.

Preferably the agents are proactive, so, for example if a particular service is not available at the time the request for information is made, the agent can check periodically, at a rate typically determined by the user, to determine whether the service has become available, and when it has provide the information to the user, via an agreed mechanism, for example e-mail.

Preferably, the agents are able to evaluate their environment to make efficient decisions on the service provision. For example, if the content service provider is able to deal with 50 requests per time period, but has a queue of 200 requests to deal with, the agent could assess the situation and then send a message to the user stipulating an estimated time at which the service will become available. Preferably, when the service becomes available, there is a validation stage for checking whether the user still needs the information.

According to yet another aspect of the present invention, there is provided an agent-configurator comprising: an agent component selector for allowing user selection of one or more of a plurality of possible agent components; an agent process selector for allowing user selection of one or more of a plurality of possible processes for use by the selected agent components, and a customised agent description store for grouping the selected components and processes together, the said grouping defining the structure of the customised agent.

An advantage of this system is that a system user can select or alter agents from the system's interface without the need for intervention at code level.

Preferably, means are provided for determining where in the network the agent is to be located. The system can follow one of a series of pre-defined agent deployment policies or rules (e.g. load balancing, deployment per agent type, a specific type of agent on a particular machine) or it can simply be instructed to deploy an agent on a specific machine chosen by the user.

Preferably, each component has a group message board on which messages are placed for communicating to processes within the component. Preferably, one of the components has an internal message board on which inter-component messages are placed by processes in a given component, for passing to other processes within other components in the agent. Preferably, one component has an external message board on which messages are placed by processes for communicating to other agents in the distributed network. The internal and external message boards may be in the same component.

Preferably the agents are proactive, so, for example if a particular service is not available at the time the request for information is made, the agent can check periodically to determine whether the service has become available, and when it has provide the information to the user.

Preferably, the agents are able to evaluate their environment to make efficient decisions on the service provision. Preferably, when the service becomes available, there is a validation stage for checking whether the user still needs the information.

According to yet another aspect of the present invention, there is provided a method of creating user-customised agents for use in a distributed network, the method comprising: selecting one or more agent components from a plurality of possible agent components; selecting one or more processes for use by the selected components from a plurality of possible processes, and grouping the selected processes and components together to create a customised agent.

According to yet a further aspect of the present invention, there is provided a distributed agent system including a plurality of agents arranged to interact one with another within an agent community, each agent including: a plurality of agent components, each of which includes processes arranged to carry out a particular task for the agent; a group message board within each of the components, for mediating communications between processes of the same component, and a central message board, for mediating communications between processes of different internal components and other agents in the agent community, the central message board including a first process for mediating internal inter-component communication, and a second process for mediating external communications with other agents in the agent community.

Preferably, the central message board comprises an internal message board for mediating communications between processes of different internal components, the first process being part of the internal message board. Preferably, the central message board comprises an external message board for mediating communications between processes of different internal components, the second process being part of the external message board.

Preferably, inter-component messages pass from the process sending the message via the group message board to the central message board. Preferably, the message is subsequently forwarded to the group message board to which the inter-component message is directed. Preferably, inter-component messages are sent from the group message board to the internal message board. Inter-component messages may be forwarded to the group message board from the internal message board.

Preferably, inter-agent messages pass from the group message boards to the central message board and from there to the central board of the external agent to which the inter-agent message is directed. Inter-agent messages typically pass from the internal message board to the external message board and from there to the external agent to which the inter-agent message is directed. Inter-agent messages may be received in the external message board and passed to the internal message board. The internal and external message boards may be in the same component.

A filter may be provided for delegating or defining where messages should be passed. The filter may be registered in the internal message board. The filter may be registered in the group message board. This activity is transparent for the user of the system and is accomplished automatically when the agent is created.

BRIEF DESCRIPTION OF THE DRAWINGS

Various systems and methods in which the present invention is embodied will now be described by way of example only, and with reference to the following drawings, of which:

FIG. 1 is a schematic representation of a system for enabling a user to obtain access to information provided by information content providers;

FIG. 2 is a schematic representation of a distributed software agents platform used in the system of FIG. 1;

FIG. 3 is a schematic representation of the physical arrangement of the software agents platform of FIG. 2;

DETAILED DESCRIPTION OF EXEMPLARY NON-LIMITING EMBODIMENTS

Figure 4:
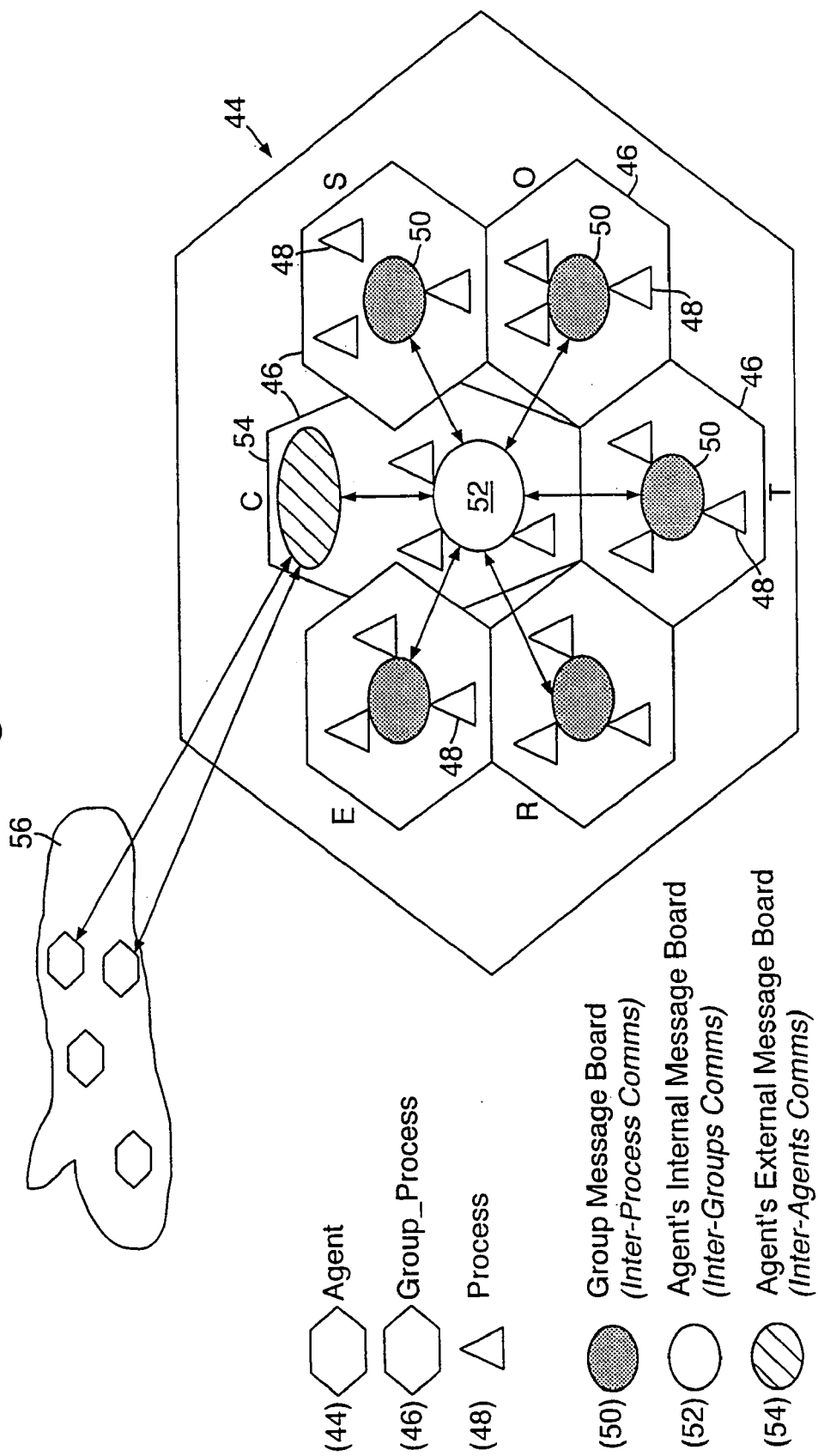
FIG. 4 is a schematic representation of a model of an agent for use in the distributed software agents platform of FIG. 2.

FIG. 1 shows a system for the provision of customised information content to a customer. This system has several layers, the first 20 of which comprises user terminals, for example, mobile phones, portable PC's, set-top boxes or other such devices, to provide users with physical access to the system. Such access is made via a network layer 22, typically the Internet, or a satellite communications system, or some other such communication network. The next layer 24 is a distributed software agents platform for controlling the provision of services to the customer. The final layer 26 comprises the facilities and services provided by service content providers, which services can be contracted via the distributed software agents platform and delivered to the customer via various networks, for example the Internet.

The distributed software agents platform 24 is shown in detail in FIG. 2. This has four levels. Firstly, a platform management level 28 that includes a configuration module (CM) 29 and a monitoring or performance module (PM) 31. This level enables configuration, maintenance and monitoring of the system. Next there is an enabling agents level 30 for enabling the system to operate from the financial and market perspective and a service provision agents level 32 for enabling interaction between the customer and the services provided by the content suppliers. Finally, there is a service delivery/execution agents level 34 for delivering services required by the customer. This is effected by allowing the platform to interact with a network interface 38 that is provided for connecting the platform 24 to the network.

Platform 24 uses a standard network protocol for inter-agent communication.

In order to allow the user to interact with the platform 24, typically two further interfaces 40 and 42 are also provided. Firstly, a simple user interface (UI) 40 for communicating requests for information from the user to the platform 24 and back. Secondly a graphical user interface (GUI) 42 for enabling an agent aware user to modify or update existing agents, introduce new agents or enhance the agents' component/process library.

At this stage it is important to note and make the distinction between an external user, generally referred to as the customer and an internal system user. The customer uses the UI 40 to access and use agent-based services while the system user uses the GUI 42 for development, set up and maintenance of the platform.

In order to access the distributed software agents platform 24, the user typically uses a Java enabled terminal. For example, UI 40 could run on a Java enabled fixed/mobile phone or a portable PC 20 and could be used by customers. The GUI 42 could run on a stand-alone machine, for example, a PC or UNIX work-station but would be used only by the system user. The platform interfaces 40,42 are typically not agent based.

The platform 24 is generally distributed over a plurality of host processors 36 that are able to communicate with each other, as shown in FIG. 3. Each host 36 that can be selected in the system has a local configurator (LC) and an associated local configurator server (LCS). The use of each of these is justified by the separation of generic functionality (i.e. agent creation, update, suspend, resume and kill) accomplished by the central configuration module 29 on FIG. 2 in collaboration with the local configurators (LCs), from application specific functionality accomplished via the local configuration servers (LCSs). In this way a variety of applications can be built by re-using the same generic functionality offered by the platform.

The platform 24 of FIG. 2 provides three classes of facilities, these being the main facilities that control the processing of requests from customers, development facilities that enable the system to be altered or developed and evaluation facilities for monitoring the overall performance of the platform.

Communication between the various levels of the platform 24 is effected using agents. Agents are autonomous bits of software designed to act as problem solvers. Agents may be heterogeneous in nature. In practice, the label "agent" has been used to describe a great variety of different software entities. In each application, the importance is focussed on a different aspect of "agent-hood" thereby making the expression of a general and consistent definition difficult. However, for the purposes of the present application an agent will typically be such that it can:

act on behalf of other entities in an autonomous manner.
  exhibit pro-activity and re-activeness in its actions.
  make efficient decisions by evaluating the environment inputs and outputs.
  evaluate its performance continuously.
  co-operate and communicate with other agents.

Since the distributed software agent platform of FIG. 2 implements a plurality of agents, the system is in fact a multi-agent system. In the article by Durfee, E., H., Lesser, V., R., Corkill, D., D., "Trends in Cooperative Distributed Problem Solving", IEEE Trans. Knowl. Data Eng., KOE-11(1), pp. 63–83, 1989 this has been defined to be "a loosely-coupled network of problem solvers that work together to solve problems that are beyond there individual capabilities". The overall behaviour of such systems is not globally planned, but emerges as the aggregation of the actions taken by every agent in the community. Hence, multi-agent systems are capable of adapting to changes in the environment. This is advantageous for the present application because for example, content service providers may add or withdraw services and the system needs to be able to cope with such changes.

Shown in FIG. 4 is a model of each agent 44 used in the multi-agent system of platform 24 of FIG. 2. Each agent 44 is typically divided into components 46, each of which has a particular function to perform. For example, component E (environment) of FIG. 4 monitors changes in the agent's 44 environment, such as whether a service supplier has withdrawn its services. Component R (resource management) monitors and updates the resources available to the agent 44. Component T (task) contains the task that the agent 44 has been set. Component O (organisation) controls internal organisation of the agent 44 itself. Component S (self) enables the agent 44 to monitor its own performance, for example how well it is meeting its goals. Finally, component C (communication) controls the communication between components 46 in the agent 44 and additionally communication between the agent 44 and other agents in the overall agent community.

Within each of the components E, R, T, O, S and C, there is a plurality of processes 48 that can be utilised by the agent 44 to perform the necessary functions. Additionally, there is a group message board 50 for controlling and monitoring inter-process 48 communications within a given agent component. However, in component C in addition to there being a plurality of processes 48, also provided are an internal message board 52 for exchanging inter-component communications and an external message board 54 for exchanging and controlling inter-agent communications.

Messages are placed on the group message boards 50 by the processes 48, and taken off by other processes 48 as required. In order to facilitate this exchange of messages, the processes 48 can register in the group message boards 50. Also registrable in the group message boards 50 are filters for delegating or defining where messages should be passed. The board 50 itself then passes messages onto the relevant processes 48 using information in the filters.

Figure 5:
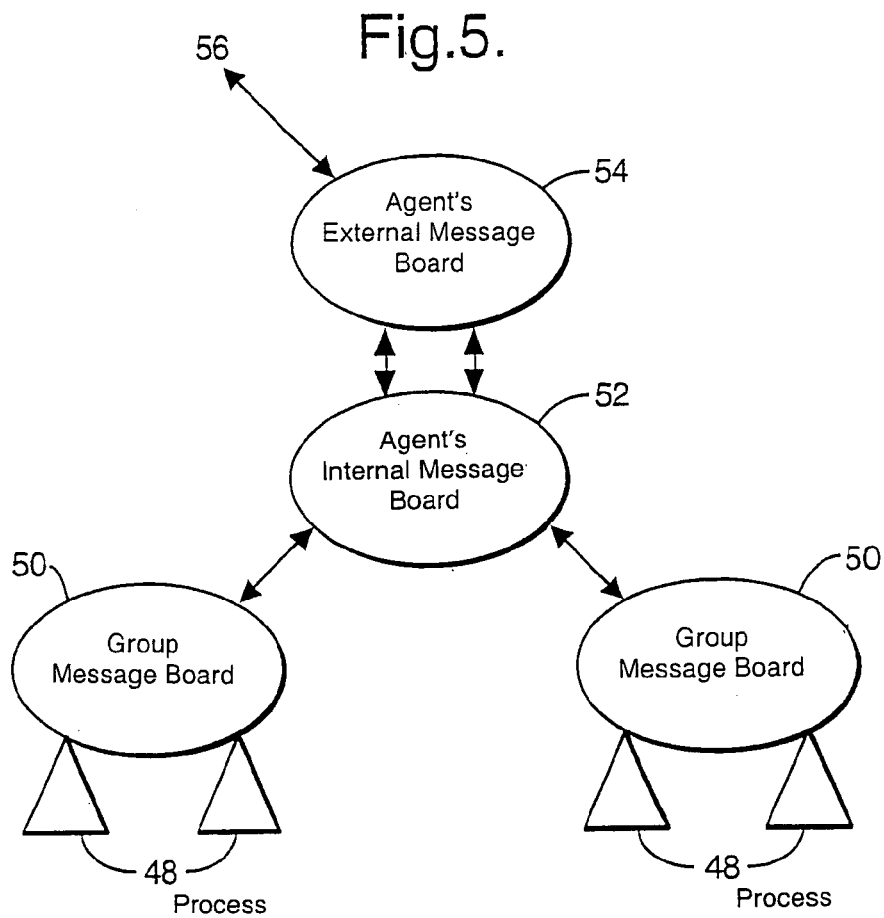
FIG. 5 is a schematic representation of the hierarchy of the agent shown in FIG. 4.

FIG. 5 shows the hierarchy of the agent 44 of FIG. 4. From this it can be clearly seen that all inter-component communications pass between the group message boards 50 via the internal message board 52. Additionally, all inter-agent communications are placed on the group message boards 50 from where they are automatically forwarded to the internal message board 52 in component C. These communications are subsequently passed to the external message board 54 from where they are sent to external agents 44 in the agent community 56.

Within the agent community, each agent 44 has a specific and local knowledge and is responsible for performing a task. The agents 44 in the community each perform their individual tasks and exchange information in relation to these tasks in accordance with a pre-designed interaction protocol. The agents 44 provide global service control by co-operating with each other, exchanging partial results and information and co-ordinating their actions in accordance with a given service scenario.

The agent 44 of FIGS. 4 and 5 allows functional separation and detailed granularity of related activities (per process within a component). In addition, processes 48 and components 46 can be added as desired, thereby making the agents' 44 architecture open and scalable. Furthermore, processes 48 can be updated by replacing the old processes with new processes, as they become available through development. Also, processes 48 and/or components 46 can be readily deleted as and when necessary.

The use of group message boards 50 in each component 46 and a global board 54 for external communication means that communication between agent components is kept internal to the agent 44. This is generally advantageous. Also advantageous is the fact that the platform 24 provides a generic agent shell that can be customised to suit the needs of the application and create the type of agent required.

Returning to the platform 24 shown in FIG. 2, the platform management level 28 will now be described. This is includes the configuration and monitoring modules 29 and 31 respectively. The monitoring module 31 is for monitoring the performance of the agents within the agent community in accordance with user specified parameters. The configuration module 29 (or agent-configurator) is for configuring the system to serve a particular application, in this case the customised multimedia content services that requires the creation of various agent types to represent the customers, service providers and content suppliers. This module 29 is shown in detail in FIG. 6.

Included in the configuration module 29 is a description server 62 that is divided into two parts that will be referred to as the default agent store and the customised agent description store. The default agent store is the right hand side (RHS) 64 of the description server 62 of FIG. 6 and the customised agent description store is the left hand side (LHS) 66. Stored in the default agent store or RHS 64 is a description of an agent 44 that includes the maximum set of components 46 for that agent 44. This is the default setting. Stored in the customised agent description store or LHS 66 is a customised description of agents 44. This description is customised when the system is set-up by selecting from the RHS 64 those components 46 required. This ability to modify the configuration of agents 44 in the platform 24 is generally only available for agent-aware users otherwise the configuration is the default setting in the RHS 64 of the description server 62.

Also contained in the configuration module 29 is a host selector 68 for selecting where agents 44 are to be stored within the platform 24, that is on which machine 36 within the platform 24 a particular agent 44 is to be stored. The host selector 68 could decide where a particular agent is to be located based on geographic considerations, for example the agents for all users from say Edinburgh could be located in one host. Alternatively, the host selector 68 could merely spread the agents evenly around the network of possible hosts 36. More generally, the host selector determines the agent locations based on which agent deployment policies or rules are selected by the user. The host selector could be instructed where to put the agents 44 manually by a user. In this case, the deployment policy would be overridden by the user's manual host selection.

Finally, the configuration module 29 additionally includes a code server 70 that is segmented into separate groups one for each agent type. This is employed for storing the code for processes 48 during development of the system. New processes 48 can be added to the agents 44 by creating those processes 48 and storing them in the code server 70.

Figure 6:
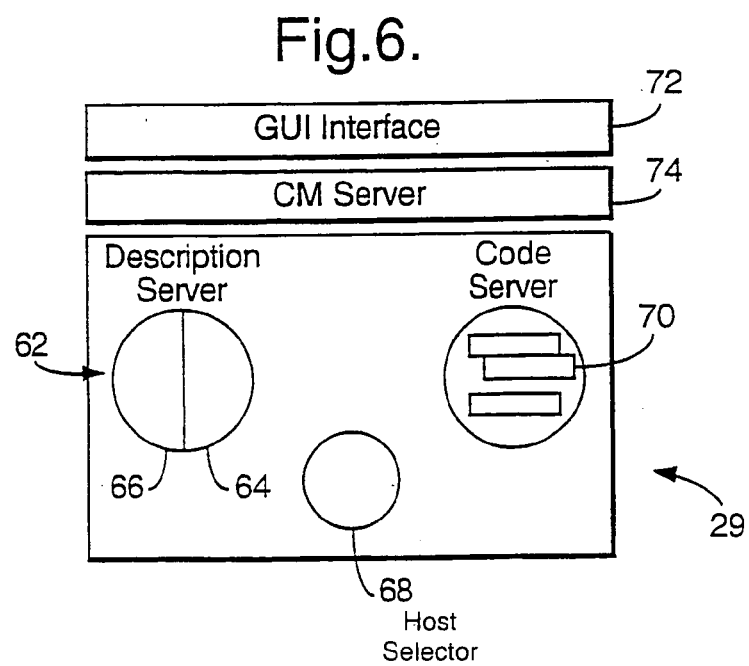
FIG. 6 is a diagrammatic representation of a configuration module for use in the platform of FIG. 2.

The configuration module 29 is the point of access to the overall system for the agent aware user. Between the configuration module 29 and the UI 40 or GUI 42 is a user interface 72, as shown in FIG. 6, for allowing user access to the system. Having such an interface 72 means that the UI 40, GUI 42 and the configuration module 29 can operate in different languages.

All communication between UI 40 and the configuration module 29 is done via a firewall interface, thereby to provide security of access for external users of the system. The interface GUI 42 is within the fire wall closely coupled with the platform 24 and it is generally operated only by agent aware personnel for platform development, set up and maintenance. Configuration server 74 has the role of dealing with application specific functionality at the central configurator level in the same way that the local configuration servers (LCS) are doing on every host in relation to the local configurators (LC).

Returning again to the platform 24 of FIG. 2, the enabling agents level 30 will now be described. This level 30 includes enabling agents that help and support other agents in the system to function. The enabling agents must exist before any other agent can be created and added to the overall system. In order to provide system integrity and security, these agents are not accessible and cannot be altered by any system user but only the ones given permission to do so.

Included in the enabling agent level 30 is a billing agent (BLA) that allows for dynamic billing, a banking agent (BKA) that acts effectively as a bank in the conventional sense and a marketing agent (MKA).

The billing agent can be considered as the representative and interface into a more comprehensive billing system provided by the platform 24 provider. Each customer has a billing account and the billing agent monitors service use of the system and bills the appropriate customer at the end of a transaction. Each customer billing account is continuously updated and reflects the current bill value for that customer. This account could be monitored in connection with the customer's real bank account to prevent the use of services for which the customer has no means to pay. Agent owners typically have an account that is updated and monitored by the billing agent.

The banking agent monitors financial transactions that occur when a service is provided to a customer. The banking agent can be considered as a representative and interface into a real banking system of a trusted bank, external to the platform 24.

The MKA is provided to co-ordinate requests regarding a particular market sector entered onto the agent's platform 24. This will described in greater detail later.

The next level of the platform 24 includes service provision agents. Typically three types of agent will be provided in this level—a customer agent (CMA), a service agent (SVA) and a customer supplier agent (CSA). The CMA is "owned" by the customer. The CMA includes information on the customer's preferences and is responsible for satisfying its customer's request by selecting the appropriate SVA(s). The SVA is owned by service brokers and is the agent that has knowledge and searches for the information requested by the CMA. Finally, the CSA is owned by the content supplier and provides a gateway for the SVAs to the content description that the content supplier provides. The CMA cannot access the CSA directly instead it communicates with the SVA, which acts, in effect, as a broker between the CMA and the CSA.

The last level of the platform of FIG. 2 is the service delivery or execute level that sets up the physical connection, i.e. sends signals to the physical network platform. The service delivery or execute level includes service delivery agents that prepare the platform 24 for physical connection, actuate that connection and cancel the connection when the information is forwarded to the customer. The agents in this level obtain information from the CMA in order to determine, for example, where and when information is to be provided to the customer. Typically, service delivery agents can also prompt a customer to determine whether the information originally requested is still required and if the answer to that prompt is no, then cancel the request. When the service delivery agents trigger the delivery of information content to a customer, in accordance with a CMA's instructions they confirm this to the CMA, which receives the message and tells the billing agent so that the customer can be billed.

When the system is set-up initially, CSAs are registered first in the service provisions level 32 of the platform 24. The presence of the CSA justifies the setting up of SVAs that are subsequently added to the service provisions level 32. CMAs are introduced when customers register to take advantage of the services provided by the SVAs and the CSAs. Of course, should new services become available further SVAs and CSAs would be added.

The term 'customer' in the context of CMAs refers to a person who is using the platform to obtain information. In contrast, the term 'customer' in the context of SVAs and CSAs refers to a person or an organisation representing a service broker or a content supplier that is willing to have a specific agent as their representative within the agent platform 24. Hence, for clarity in the context of SVAs and CSAs, the term 'customer' will be replaced with agent owner.

Figure 7:
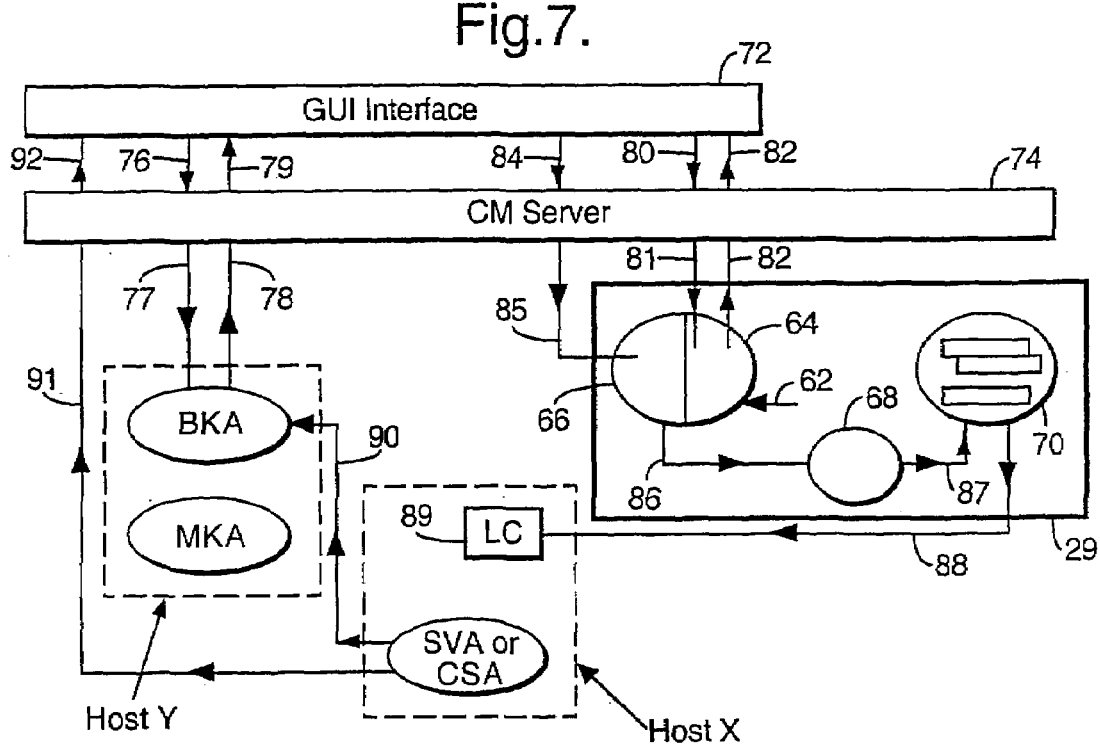
FIG. 7 illustrates the steps involved in the creation of a customer agent for use in the platform of FIG. 2.

The steps required to set up a SVA or a CSA are shown in FIG. 7. These steps can only be taken from the GUI 42, not the UI 40, and involve firstly sending 76 a message from the GUI 42 to the GUI interface 72 and from there to the configuration module (CM) server 74 to request an account. This message includes details of the customer and his bank. The request is then forwarded 77 to the banking agent (BKA) from the CM server 74. The BKA then checks the details of the customer's bank account and depending on the results of that check opens a new system account. A message is then sent 78 to the CM server 74 confirming that a new system account has or has not been opened. The CM server 74 checks the customer details received from the BKA and then sends 79 a message to the GUI interface 72 to inform the party requesting the new SVA, or the CSA, of the result the request for a new account. When the customer has been cleared and an account has been opened the CM server 74 then provides the party requesting the new SVA or CSA with details of the account and a unique identification number.

Once this checking stage has been completed, the agent owner then requests that a new agent be created. This causes the GUI 42 to ask the agent owner for his identification number and what type of agent is required. The agent owner then enters his identification number and selects either a SVA or a CSA. On receipt of the request for a new SVA or CSA, the GUI 42 sends 80,81 a message to the right hand side 64 of the description server 62, via the CM server 74. This message includes a request for a list of the SVAs or CSAs stored in the default agent store, and a list of the available components. The requested information is then sent 82,83 to the CM server 74 and from there to the GUI interface 72, and the requesting agent owner selects the required components for the agent. A message identifying the selected components is then forwarded 84 to the left-hand side 66 of the description server 62, thereby effectively storing the new SVA or CSA structure.

Having established a new SVA or CSA, a signal is sent 86 to the host selector 68 in the configuration module 29 in order to select the location of the new agent to be created. This can be done by deploying the agent, in accordance with a chosen deployment policy, on a selected host machine that is running the language in which the agent has been implemented. For example, in FIG. 3, the reference numbers 1, 2, and 3 represent enabling agents and the numbers 4, 5 and 6 represent service provision agents.

Once this is completed, a further signal 87 is sent from the host 68 to the code server 70 to allocate a code for the new agent. This newly allocated code is forwarded 88 to a local configurator 89 in the selected location for the SVA or CSA. The SVA or CSA is then enabled. A signal confirming the details of the SVA or CSA is sent 90 to the banking agent, so that the SVA or CSA is registered therewith. Finally, a signal is sent 91 from the newly enabled SVA or CSA to the CM server 74 and the GUI interface 72 confirming that the agent is on host X and is registered with the banking agent.

Figure 8:
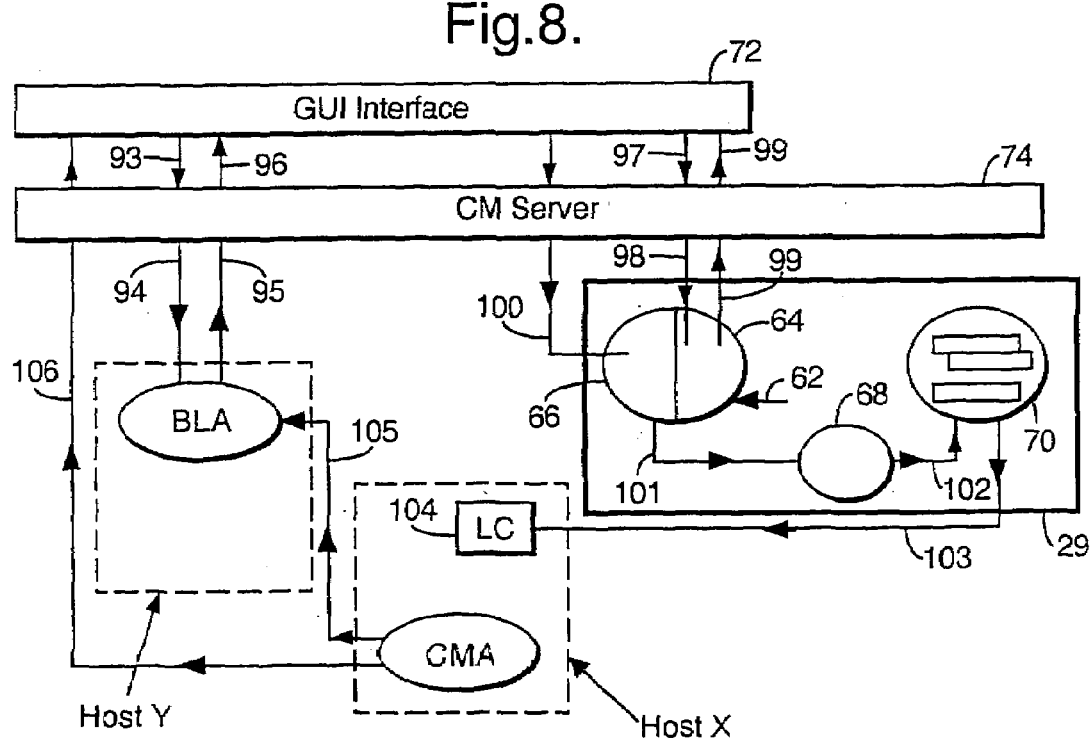
FIG. 8 illustrates the steps involved in the creation of a service content agent for use in the platform of FIG. 2.

Once the SVAs and the CSAs are set-up, external users (i.e. customers) can subscribe to agent based services and a customer agent (CMA) can be introduced to the platform for any new subscriber. Setting-up a CMA requires similar steps to those for setting up a SVA or CSA. These steps are shown in FIG. 8 and include firstly sending 93 a message from the user interface to the CM server 74 to request an account. This message includes details of the customer and his bank account. The request is then forwarded 94 to the billing agent. The billing agent responds to this by opening a new account and sending 95 a message to the CM server 74 confirming whether or not a new account has been opened. In the event that a new account is opened, the CM server 74 checks the customer's details and sends 96 a message to the GUI interface 72 confirming that an account has been created and allocating a unique agent identification number for the customer.

Once a new account is opened, the customer is then able to request that an agent be created. This request causes the UI/GUI interface 72 to send 97,98 a message to the CM server 74 and from there to the right hand side 66 of the description server 63 in the configuration module 29. This message includes a description of the type of agent requested, i.e. in this case a CMA, and the customer's identification number, as well as a request for a list of available agent functional abilities, e.g. pro-active, learning, or particular strategy for matching a customer's request to the returned offers.

Typically, the customer who is not agent aware is offered for selection a list of agent abilities and not agent components. The link between the abilities and the components required to accomplish them is transparent for the user and the system uses pre-defined agent structures in order to satisfy a customer's selection. The task component of a CMA, for example, would typically include processes to deal with a request from its customer to select and send out messages from platform 24 to the network. The requested information on the available abilities is then sent 99 to the UI/GUI interface 72 via the CM server 74 and the customer may make the relevant selection. Once the abilities are selected, a message is then forwarded 100 to the left-hand side 64 of the description server 62 indicating the selected agent components.

Having selected the desired abilities, a signal is sent 101 from the description server 62 to a host selector 68 in the configuration module 29 in order to select the physical location of the agent. The host 68 then sends 102 a signal to the code server 70 in order to allocate a code for the new agent. This newly allocated code is sent 103 to a local configurator 104 in a particular host, for example, host X, and the CMA is enabled. The local configurator then sends a signal confirming the details of the CMA to the billing agent and the CMA is registered therewith. Finally, a signal is sent 105 from the newly enabled CMA to the CM server and the GUI interface 72 confirming that the CMA is on host X and is registered with the billing agent.

Once the CMA is created a customer can start requesting customised multimedia content services. However, as mentioned previously, the CMA cannot access the CSA directly instead it communicates with the SVA, which acts, in effect, as a service broker between the CMA and the CSA.

In order for the services of a CSA to be made available to a CMA, the CSA owner must subscribe to marketing services, which are co-ordinated by the marketing agents (MKA) in the enabling agents level of the platform 24. The marketing agents divide the services made available through the platform 24 into different market sectors, for example movies or science and technology documentaries. Typically, a marketing agent is provided for each market sector.

In order for a CSA to subscribe to market services, the CSA owner must indicate via the GUI which market services are required, that is, typically, in which market sectors the CSA wishes to be advertised. A message is then sent from the GUI 42 via the CM server to the banking agent. The banking agent then checks for the existence of a marketing agent (MKA) in that market sector. If a marketing agent exists then the banking agent merely passes the message from the CSA to that MKA. If no MKA exists, the banking agent sends a message to its local configuration server to create a MKA and stores the details of that new MKA such as its type, its identification number and its location for further reference. The MKA then sends a message to the banking agent to register therewith. The banking agent subsequently sends a message to the MKA containing the agent owner's request for market services.

The banking agent is used to check whether an MKA exists because all MKAs have to be registered with the bank. The banking agent holds knowledge of all of the marketing agents in the agent community. Hence, the banking agent can effectively be used as a directory for these agents.

Figure 9:
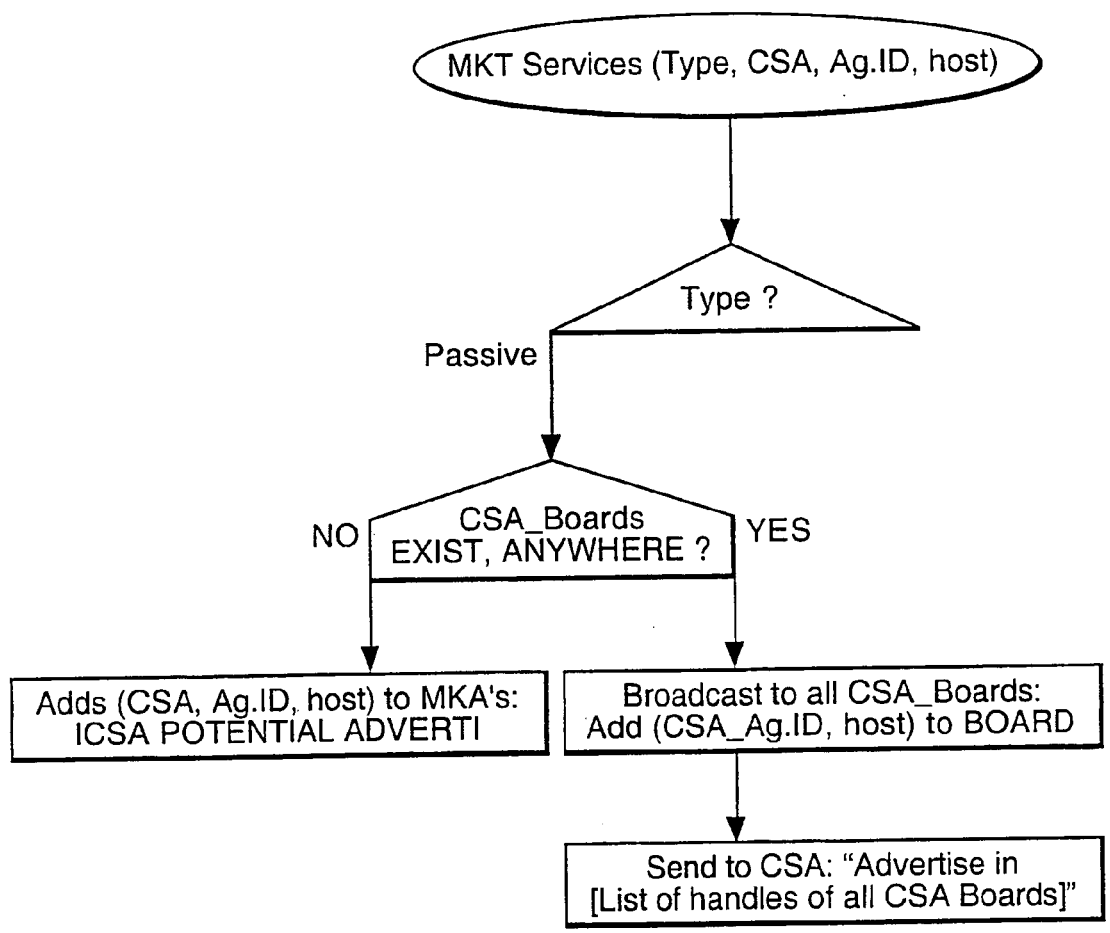
FIG. 9 is a flow diagram illustrating the behaviour of a marketing agent of the platform of FIG. 2 when a new customer supplier agent is formed.

The steps taken by the MKA when it receives a request for market services from a CSA are shown in FIG. 9. The MKA identifies firstly, the type of the requesting agent, i.e. in this case a CSA, its identification number and its location. The MKA then investigates and creates the correct advertising facility for that agent. In the case of CSAs, advertising involves advertising its services on a CSA advertising board (CSA_board).

Once this is done, the MKA checks whether any CSA_ boards are already in existence in the market sector of interest. If such boards do exist, the MKA sends all of them a request to add the requesting CSA, together with details of that CSA, such as its type, its location, i.e. which host it is on, and its unique identification number. The MKA then sends a signal to the CSA, which includes the addresses of all the available CSA advertising boards and instructs the CSA to start advertising in all those boards. If a CSA_board does not exist, the MKA adds the details of the requesting CSA, again such as its host and its unique identification number, to a list that will be referred to as the "CSA POTENTIAL ADVERT" list. This happens until an SVA is introduced and a CSA_Board is needed. When this occurs, a new CSA_board is created and the agents included on the 'CSA POTENTIAL ADVERT' become a part of that new CSA_board.

Once the CSA is advertised on a CSA_board its services are available for the SVAs to browse through. In fact, a CSA_board will be created on every machine hosting at least one SVA.

The steps described above create distributed advertising boards as opposed to a central advertising board. The boards are created locally where there is a need for them. The system intelligently detects this need, creates a local board and furthermore maintains the consistency amongst the distributed boards. For example, service broker agents need to be aware of what is on offer from the content suppliers. Hence where an SVA exists a CSA_board will be created. Similarly, where a CMA exists a local SVA_Board will be automatically created by the system to allow the CMA to select the appropriate service broker to act on its customer's request.

Whilst the SVAs communicate with and browse through the CSA_boards, the CMAs only have access to information made available through the CSAs via the SVAs. To this end the SVAs must subscribe to marketing services in order to advertise their services to the CMAs. Again, these services are co-ordinated by the marketing agents (MKA) in the enabling agents level 30 in the platform 24.

In order for the SVA to subscribe to marketing services a message is sent from the user interface via the CM server to the banking agent. The banking agent then checks for the existence of a MKA. If a MKA exists then the banking agent merely passes the message from the SVA to the MKA. If no MKA exists, the banking agent sends a message to a local configuration server to create a MKA. The local configuration server passes the message to the local configurator that creates a new MKA and includes in it details such as its type, its location and its identification number. The MKA then sends a message to the banking agent including all of its details so that it is registered. Finally, the banking agent sends the MKA a message containing the request for the market services.

Figure 10:
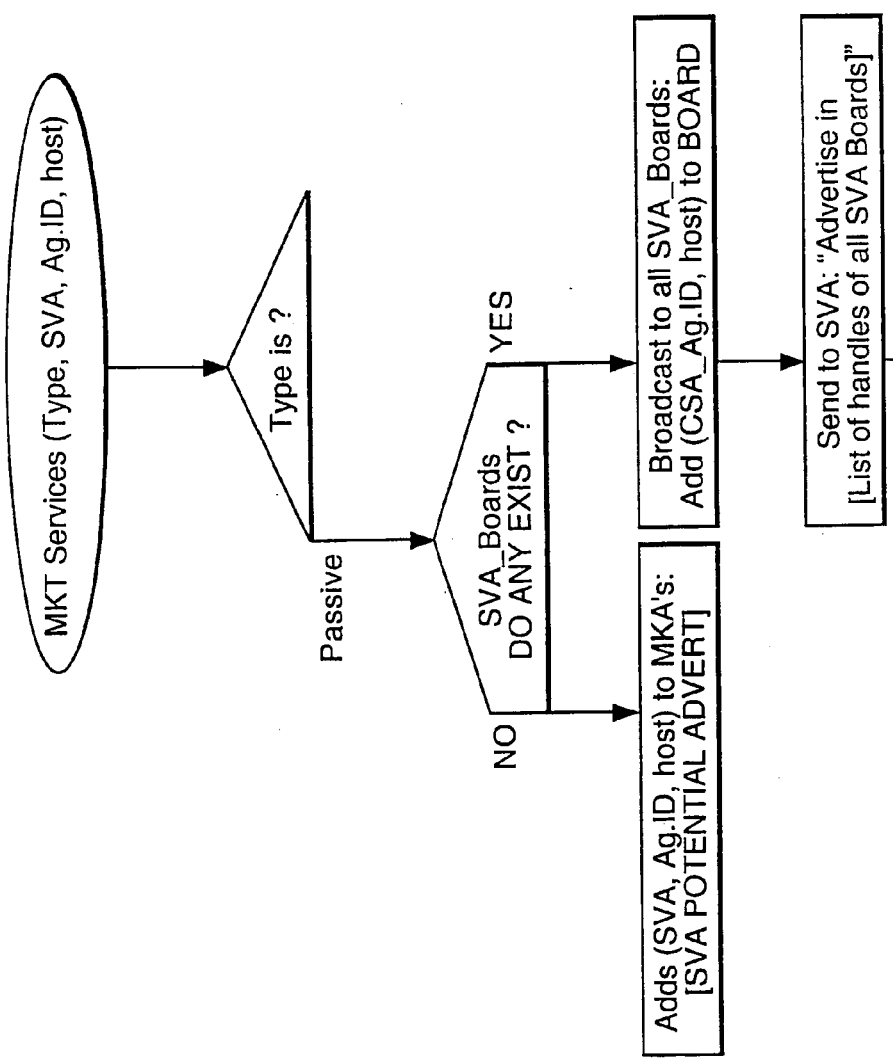
FIG. 10 is a flow diagram illustrating the behaviour of the marketing agent of the platform of FIG. 2 on creation of a new service agent.
Figure 10:
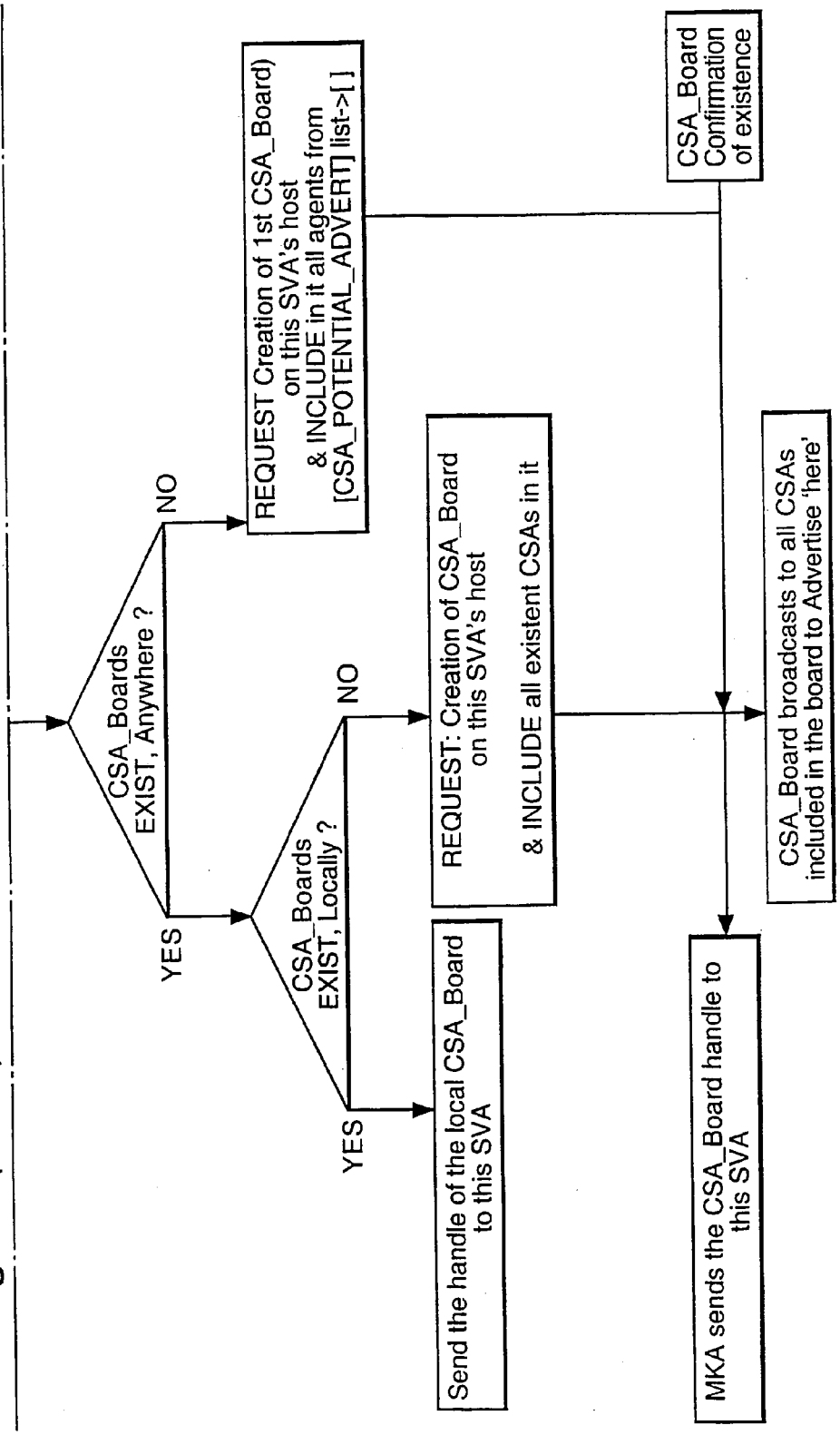

The steps taken by the MKA when it receives a request for market services from a SVA are shown in FIG. 10.

The MKA identifies firstly the type of the requesting agent, i.e. in this case a SVA, its identification number and location. The MKA then checks whether any SVA_board is already in existence. If any SVA_boards do exist, the MKA sends all such boards a request to add the requesting SVA, together with details of the SVA, such as its host and its unique identification number. The MKA then sends a signal to the SVA, which signal includes the addresses of all the available SVA advertising boards, and instructs the SVA to advertise in all those boards. If a board does not exist, the MKA adds the details of the requesting SVA, again such as its type, its host and its unique identification number, to a list that will be referred to as the "SVA POTENTIAL ADVERT" list. This list is necessary until a CMA is introduced and an SVA_Board is needed for it. When this occurs, a new SVA_board is created and any agent(s) included on the 'SVA POTENTIAL ADVERT' list become part of that new SVA_board.

Once the SVA is advertised on a SVA_board its services are available for the CMAs to browse through. In practise, a SVA_board will be created on every machine hosting at least one CMA.

As before, the steps described above create distributed advertising boards as opposed to a central advertising board and the boards are created locally where there is a need for them. The system intelligently detects this need, creates a local board and furthermore maintains the consistency amongst the distributed boards. For example, customers need to be aware of what is on offer from the service brokers. Hence, where a CMA exists a local SVA_Board will be automatically created by the system to allow the CMA to select the appropriate service broker to act on its customer's request.

In order to function efficiently, the SVA agent needs to have the details of all the SVA_boards created to allow it to advertise its services for the perusal of the CMAs. The SVA also needs to know the details, such as location, of the local CSA_board created on its machine to be able to read the CSA's offers. Hence, once a SVA is advertised on a SVA_board, the MKA sends a signal to determine whether any CSA_boards exist. If such boards do exist, the MKA enquires as to whether they exist locally, if the answer to this query is yes, then the details of this CSA_board are sent to the requesting SVA. However, if such boards do not exist locally, the MKA requests the creation of a CSA_board on the SVA's host and that all existent CSAs be placed in it. The CSA_board then broadcasts to all CSAs included in the board "advertise here!". If no CSA_boards exist the MKA requests the creation of a CSA_board on the SVA's host, and then includes in that CSA_board all the available CSA agents from its CSA POTENTIAL ADVERT list. The MKA then sends details of the CSA_board, including in particular its location to the SVA. The SVA subsequently stores the details of the CSA_board so that it can refer to it at a later date, as and when required.

Figure 11:
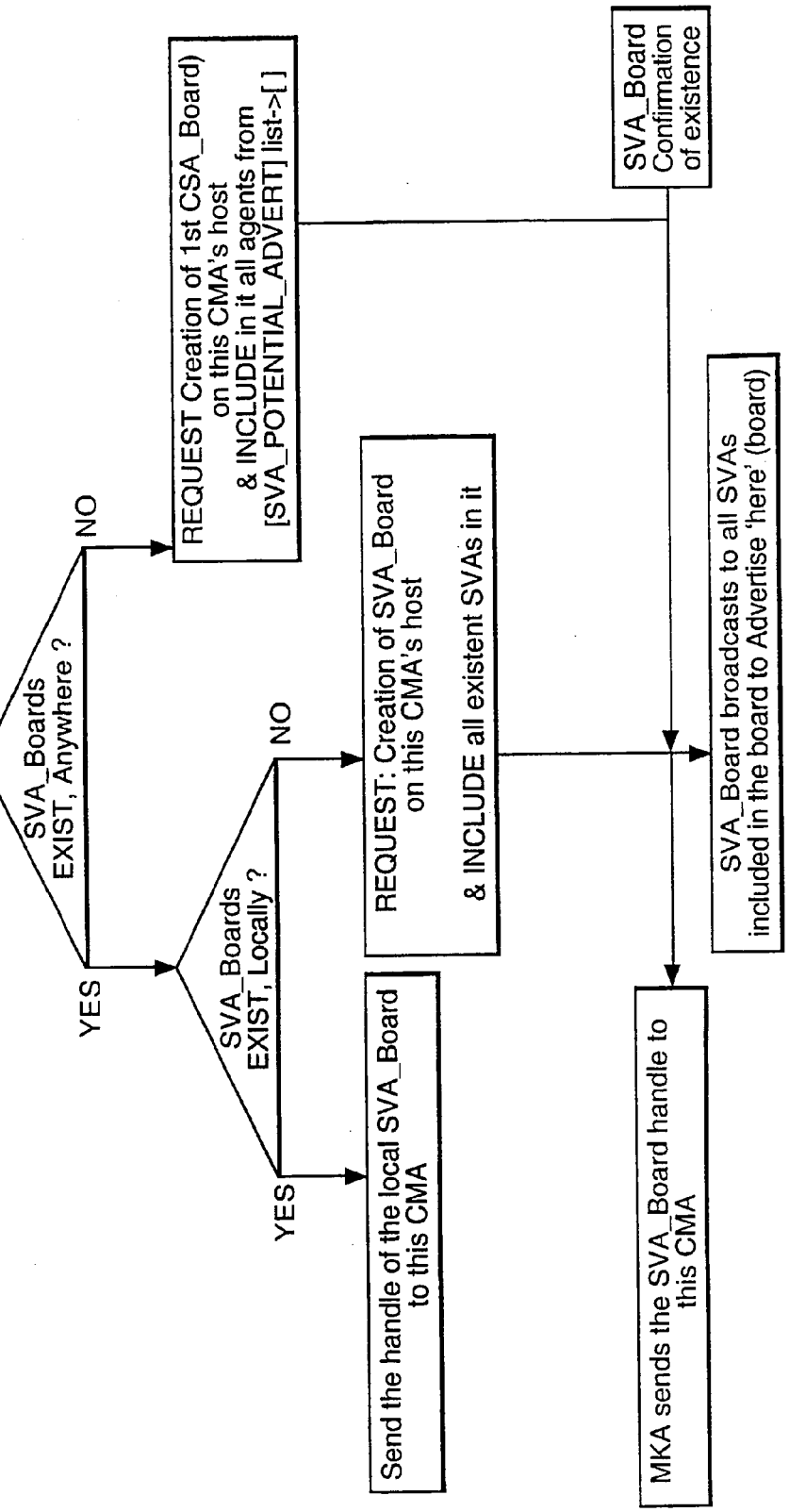
FIG. 11 is a flow diagram illustrating the steps taken by the marketing agent on creation of a new customer agent.

In order for a CMA to access information in the SVA_board, it must access the MKA to determine whether any SVA_board exists. When such a CMA is newly created it does this by sending a message to the configuration module, which provides the location of the MKA. The CMA then sends the MKA a message requesting whether a SVA_board is in existence. The steps taken subsequently are shown in FIG. 11. If a SVA_board does exist the MKA determines whether it exists locally, if it does the MKA sends the location of the local SVA_board to the requesting CMA. If a SVA_board does exist, but not locally, the MKA requests the creation of a SVA_board on the CMA's host machine and includes in it all available SVA's. The SVA_board then broadcasts to all SVAs "Advertise here". If a SVA_board does not exist the MKA requests creation of a first SVA_board on the CMA's host and includes in it all agents from the SVA POTENTIAL ADVERT list. The MKA then confirms existence of the SVA_board to the requesting CMA, and sends it details of the SVA_board location.

Once the CMA receives the SVA_board location, it stores this and sends a request to the SVA_board asking how many agents advertise currently. If the SVA_board replies that no agents are currently available, then this message is passed from the CMA to the user via the CM_server. If the SVA_board replies that there are SVAs available then the CMA sends a message to the CM_server, which passes a message to the UI/GUI that the CMA is ready for requests.

The market provided via the platform is by its nature dynamic. Typically, SVAs and CSAs will come and go from the system and from the SVA and CSA boards respectively as providers enter or withdraw from the market. However, in the event that all the agents leave a board, that board will not become de-activated, but instead will operate with an empty list of active members. Should this happen, a CMA upon detection of such an empty list in a SVA_board will send to the CM server 72 a warning message that no services are available. This causes the CM server to temporarily prevent customers from requesting information. If a SVA detects an empty list of CSAs or missing CSAs in a CSA_board, that SVA will stop advertising the services of the CSAs or only advertise those CSAs that remain on the list. On return of agents to the platform, they are merely added to the appropriate advertising board.

As regards the advertising boards generally, these can be specific to a particular marketing agent, i.e. sector based, or can be distributed, so that various market sectors can be advertised on a given board. Each option can be beneficial depending on the circumstances. For example, for a narrow service range having only a few market sectors the sector based boards could be computationally more efficient, whereas when there are many sectors the mixed/distributed advertising may be more appropriate.

The advertising boards are also agent based. This is because they have their own knowledge, for example the list of activated/de-activated subscribing agents, and they are able to conduct searches on their own knowledge to identify suitable agents for dialogue. In addition, the boards are able to communicate with the market agent and make decisions on when and with which agent to communicate information.

When a CSA, an SVA and a CMA are set up, the user can then enter a request for information via the GUI or the UI. This request is passed through the configuration server and is processed by the banking agent in the enabling agent level. If the banking agent validates the request, that request is then passed to the CMA in the service provisions agent's level 34. At this stage the customer is provided with a number of options, for example the customer can indicate a pricing limit and/or how he wishes to receive any information found i.e. by post or by fax. Additionally, he can request that the agent forward information to his PC or TV set at home. In addition, if the user needs to be kept up to date, the CMA can be requested to provide information over a range of dates at specified times, so for example the user could be provided with an information update every day, at say 2 pm. In this way the user is able to keep track of information becoming available. When the customer makes the relevant selection it is recorded by the CMA.

Once the user selections have been established, the CMA browses through the SVAs advertised in the SVA_board on its host computer. If the CMA selects the services of a particular SVA, the customer request is forwarded thereto. The selected SVA then peruses the CSAs advertised in its local CSA_board and selects the most appropriate CSAs for the job. The CSAs then provide the information or service required to the SVA and from there to the CMA. If the user accepts the information and wants it delivered an acceptance message is sent to the CMA and from there via SVA to the CSA. Upon receiving the acceptance message, the CSA forwards to the banking agent an invoice for the SVA owner for the services provided. The SVA then forwards details of the transaction to the banking agent, placing an invoice for the customer who requested the service. The banking agent detects that is an invoice for a customer and in turn forwards the information to the billing agent so that the requesting customer can be billed for the service provided. In parallel to this, the CSA triggers into action an execution or service delivery agent (EXA) passing to it the index of the content to be delivered. In addition the CSA forwards to the SVA a unique identifier for that EXA. In turn the SVA will pass the identifier to the CMA.

In order to deliver the accepted information content to the user, the CMA sends a message to the activated EXA in the execute level in platform 24. This message contains the time that the user wishes to receive the information and the required address for delivery. In response to this the EXA makes the relevant connection and then dies.

By using the above mechanism confidentiality between customers and content suppliers is preserved and cannot be abused by either party. In addition, by allowing the EXA to die after its job is done the system can make better use of its computation resources using them only as and when necessary.

Once the services are provided, the banking agent updates the information content supplier and information broker accounts and passes billing information to the billing agent. The billing agent then updates the customer's account and prepares a bill. The co-operation between the banking and billing agents means that a customer only has to pay a single bill. Furthermore, since the banking agent is up-dated as soon as a particular service is provided, whether that is by the CSA or the SVA, the system provides real-time billing capability. It is envisaged that the user will have access to details of his account with the system.

The use of a multi-agent system is advantageous in many respects. For example, such systems are able to solve problems that are too large for a centralised single system, either due to resource limitation or because of the risks that a centralised approach involves. Furthermore, each agent specialises in a particular function so that the agent community acts as a group of experts that collaborate to solve difficult problems in a functionally distributed application. The solutions that are provided by the agents may draw from distributed information sources. The use of a multi-agent system also enhances the speed and reliability of the overall system and provides the system with the ability to tolerate uncertain data and knowledge.

The present invention provides a method and a system for dynamically creating agents to act on behalf of service providers and users. The system is capable of gathering customers' preferences, identifying relevant service content sources and finding information content that best matches the needs of the customer. This is a very flexible and simple system. When a customer accesses the system he/she is asked to choose the information content to be supplied and specify the form of the notification, for example e-mail, SMS, fax and delivery, e.g. to a PC via the Internet or a TV set via a different network platform. The system then organises the delivery of the information at a time and to a location specified by the customer.

What is claimed is:

1. A distributed platform for co-ordinating user access to information provided by content service providers, the platform comprising:
    (a) a user interface;
    (b) a first advertising board for advertising services of information brokers;
    (c) a first searching agent for searching the first advertising board for services based on a request from the user;
    (d) a second advertising board for advertising the services of at least two separate information content suppliers;
    (e) a second searching agent for searching the second advertising board for available services based on results of the search of the first advertising board and the request from the user, and
    (f) means for providing the results of the search of the second advertising board from the second advertising board to the first advertising board, and transferring the results from the first advertising board to the user interface through the first searching agent.

2. A distributed platform as in claim 1, wherein the first and second advertising boards are distributed.

3. A distributed platform as in claim 1, wherein a plurality of first and second advertising boards are provided each of which advertises the services available in a particular market, each of the first advertising boards being searchable by the first searching agent based on the request from the user.

4. A distributed platform as in claim 1, wherein means are provided for interrogating the user to determine specific preferences.

5. A distributed platform as in claim 4, wherein the specific preferences comprise where and/or how and/or when the information found by the second searching agent, is to be communicated to the user.

6. A distributed platform as in claim 1, wherein a banking agent is provided for monitoring all financial transactions that take place as a result of the request from the user, between the information brokers and the at least two separate information content suppliers.

7. A distributed platform as in claim 6, wherein each user has an account that is monitored by the banking agent and is up-dated as soon as response to a request for information is accepted for delivery to the user.

8. A distributed platform as in claim 6 in which the first searching agent monitors the user interface for an acceptance message which is transferred to the information content supplier selected from the second advertising board by way of the information broker selected from the first advertising board.

9. A distributed platform as in claim 8 in which the selected information content supplier forwards transaction details to the banking agent, said details identifying the information broker and the information broker forwards additional transaction details to the banking agent to cause a billing agent to bill the requesting user.

10. A distributed platform as in claim 8 in which the content supplier causes launch of an execution agent to effect delivery of the selected service to the requesting user.

11. A distributed platform as in claim 1, wherein a marketing agent is provided for setting up the first and second advertising boards and subsequent boards introduced onto the platform.

12. A distributed platform as in claim 11, wherein the marketing agent arranges the boards according to the type of services being marketed thereon.

13. A distributed platform for co-ordinating user access to information provided by content service providers, the platform comprising:
  (a) a user interface for receiving a request from a user;
  (b) a content service provider advertising board for advertising services of at least two separate content service providers;
  (c) a first searching agent for searching the content service provider advertising board for services, based on the request from the user;
  (d) means for providing the results of the search of the content service provider advertising board to the user;
  (e) a broker advertising board for advertising the services of brokers that act as intermediaries between the content service providers and the user; and
  (f) a second searching agent for searching the broker advertising board for available services based on the request from the user,
  wherein the second searching agent identifies a suitable broker based on the request from the user, and the first searching agent is associated with that identified broker so that the first searching agent searches the content service provider advertising board for services based on the identified broker as well as the request from the user.

14. A distributed platform for processing a user request for information, the platform comprising:
  (a) a user interface for receiving a user request for information;
  (b) a service agent board for advertising services of a plurality of service agents;
  (c) a customer agent for searching the service agent board and selecting at least one of service agent from the plurality of service agents based on the received user request; and
  (d) a customer provider agent board for advertising the services of at least two separate information content providers;
  wherein the at least one selected service agent searches for and selects at least one information content provider from the customer provider agent board, and the at least one selected information content provider provides information based on the received user request to the at least one selected service agent which in turn provides the information to the customer agent.

15. A distributed platform as in claim 14, wherein the service agent board and the customer provider agent board are distributed.

16. A distributed platform as in claim 14, further comprising a plurality of service agent boards and customer provider agent boards, wherein the service agent boards are searchable by the customer agent based on the request received by the user interface.

17. A distributed platform for co-ordinating user access to information provided by content service providers, the platform comprising:
  (a) a user interface for receiving a request from a user;
  (b) a first advertising board for advertising services of information brokers;
  (c) a first searching agent for searching the first advertising board and selecting a particular information broker based on the request from the user;
  (d) a second advertising board for advertising the services of at least two separate information content suppliers; and
  (e) a second searching agent for searching the second advertising board based on the request from the user, the second searching agent being selected by the selected information broker;
  wherein the results of the search of the second advertising board are provided from the second searching agent to the first searching agent, and then transferred from the first searching agent to the user interface.

18. A distributed platform as in claim 17, wherein the first and second advertising boards are distributed.

19. A distributed platform as in claim 17, wherein a plurality of first and second advertising boards are provided, each of the first advertising boards being searchable by the first searching agent based on the request from the user.

* * * * *

UNITED STATES PATENT AND TRADEMARK OFFICE
CERTIFICATE OF CORRECTION

| | |
|---|---|
| PATENT NO. | : 7,231,416 B1 |
| APPLICATION NO. | : 09/701194 |
| DATED | : June 12, 2007 |
| INVENTOR(S) | : Busuioc |

It is certified that error appears in the above-identified patent and that said Letters Patent is hereby corrected as shown below:

On the title page, the assignee information should appear as follows:

Item (73) Assignee: British Telelcommunications Public Limited Company, London (GB)

Signed and Sealed this

Fourth Day of December, 2007

JON W. DUDAS
*Director of the United States Patent and Trademark Office*